(12) United States Patent
Takao et al.

(10) Patent No.: US 11,336,729 B2
(45) Date of Patent: May 17, 2022

(54) EDGE DEVICE, CONNECTION ESTABLISHMENT SYSTEM, CONNECTION ESTABLISHMENT METHOD, AND NON-TRANSITORY COMPUTER-READABLE MEDIUM

(71) Applicant: MITSUBISHI HEAVY INDUSTRIES, LTD., Tokyo (JP)

(72) Inventors: Kenji Takao, Tokyo (JP); Yusuke Yamashina, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/167,240

(22) Filed: Feb. 4, 2021

(65) Prior Publication Data

US 2021/0160324 A1 May 27, 2021

Related U.S. Application Data

(62) Division of application No. 16/663,890, filed on Oct. 25, 2019, now abandoned.

(30) Foreign Application Priority Data

Nov. 12, 2018 (JP) .............................. JP2018-212479

(51) Int. Cl.
*H04L 67/12* (2022.01)
*H04L 67/75* (2022.01)
(Continued)

(52) U.S. Cl.
CPC .......... *H04L 67/12* (2013.01); *G06F 11/0754* (2013.01); *H04L 67/36* (2013.01); *H04L 41/16* (2013.01)

(58) Field of Classification Search
CPC .... G06F 11/3447; G06F 11/30; G06F 21/554; G06F 11/0754; G05B 23/0243;
(Continued)

(56) References Cited

U.S. PATENT DOCUMENTS

2002/0032511 A1* 3/2002 Murakami ............... G08G 1/20
701/50
2004/0138920 A1 7/2004 Sawanaga
(Continued)

FOREIGN PATENT DOCUMENTS

EP 1 239 434 9/2002
JP 2002-006937 1/2002
(Continued)

OTHER PUBLICATIONS

Office Action dated Aug. 12, 2020 in U.S. Appl. No. 16/663,890.
Office Action dated Dec. 23, 2020 in U.S. Appl. No. 16/663,890.

*Primary Examiner* — Tonia L Dollinger
*Assistant Examiner* — Linh T. Nguyen
(74) *Attorney, Agent, or Firm* — Wenderoth, Lind & Ponack, L.L.P.

(57) ABSTRACT

An edge device is configured to automatically establish a connection with a remote monitoring device when an abnormality has occurred in a plant. The edge device includes a controller configured to detect the abnormality based on data regarding an observation target device, and a connection establishment unit configured to establish a connection with the remote monitoring device such that the remote monitoring device is able to remotely access the edge device when the controller has detected the abnormality and determined that the abnormality matches a predetermined condition, wherein the remote access is a connection for remotely
(Continued)

checking a state of the observation target device, or for enabling a remote manipulation of the observation target device.

16 Claims, 5 Drawing Sheets

(51) Int. Cl.
*G06F 11/07* (2006.01)
*H04L 41/16* (2022.01)

(58) Field of Classification Search
CPC .............. G05B 23/0254; G05B 19/414; G05B 19/4147; G08B 25/009; G08B 1/08; H04L 67/12; H04L 67/36
See application file for complete search history.

(56) References Cited

U.S. PATENT DOCUMENTS

| | | |
|---|---|---|
| 2004/0181364 A1 | 9/2004 | Reeves |
| 2004/0201471 A1* | 10/2004 | Primm ............. G08B 13/19671 340/506 |
| 2006/0095231 A1 | 5/2006 | Okazaki |
| 2007/0093975 A1* | 4/2007 | Hoogenboom ......... H04L 67/12 702/35 |
| 2008/0224834 A1* | 9/2008 | Oosaka .................... G08B 1/08 340/286.02 |
| 2014/0278241 A1 | 9/2014 | Jiang et al. |
| 2014/0324224 A1* | 10/2014 | Dolinshek ............ G05B 19/042 700/275 |
| 2015/0149617 A1 | 5/2015 | Lai |
| 2015/0208464 A1* | 7/2015 | Heo ......................... H04W 4/70 702/189 |
| 2015/0208465 A1* | 7/2015 | Heo ......................... H04W 84/18 702/189 |
| 2016/0047566 A1 | 2/2016 | Haga |
| 2016/0226732 A1* | 8/2016 | Kim ................. H04W 12/0431 |
| 2016/0261481 A1 | 9/2016 | Ogata |
| 2016/0344745 A1 | 11/2016 | Johnson et al. |
| 2016/0371957 A1* | 12/2016 | Ghaffari ................. G08B 21/18 |
| 2017/0054687 A1 | 2/2017 | Ishigaki et al. |
| 2017/0109999 A1* | 4/2017 | Cohn ................... G08B 25/007 |
| 2017/0223765 A1 | 8/2017 | Justen |
| 2017/0351241 A1 | 12/2017 | Bowers et al. |
| 2018/0184232 A1* | 6/2018 | Maitra .................... H04W 4/70 |
| 2018/0275642 A1 | 9/2018 | Tajima et al. |
| 2018/0306671 A1 | 10/2018 | Araki |
| 2019/0203694 A1 | 7/2019 | Gupta |
| 2019/0246344 A1* | 8/2019 | Prasad .................... H04W 4/38 |
| 2019/0281370 A1 | 9/2019 | Struhsaker |
| 2019/0392292 A1 | 12/2019 | Mozo Velasco |
| 2020/0058173 A1 | 2/2020 | Gaudreault |
| 2020/0225655 A1 | 7/2020 | Celia |

FOREIGN PATENT DOCUMENTS

| | | |
|---|---|---|
| JP | 2002-073167 | 3/2002 |
| JP | 2014-194764 | 10/2014 |
| JP | 2016-034066 | 3/2016 |
| WO | 2017/030186 | 2/2017 |

\* cited by examiner

EDGE DEVICE, CONNECTION ESTABLISHMENT SYSTEM, CONNECTION ESTABLISHMENT METHOD, AND NON-TRANSITORY COMPUTER-READABLE MEDIUM

CROSS-REFERENCE TO RELATED APPLICATION

Priority is claimed from Japanese Patent Application No. 2018-212479, filed Nov. 12, 2018, the content of which is incorporated herein by reference.

TECHNICAL FIELD

The present disclosure relates to an edge device, a connection establishment system, a connection establishment method, and a program.

BACKGROUND ART

Machines with rotating parts such as compressors, pumps, and paper machines, paper converting machines are often used in plants. So-called operation data such as vibration data obtained from these machines is important data regarding operation of plants. Therefore, plant operators are often afraid of leakage of the operation data to the outside and connections between plants and external networks are often cut off Japanese Unexamined Patent Application, First Publication No. 2016-034066 discloses a technology that provides a security gateway to select data transmission information according to a situation.

SUMMARY

In the related art, if a machine malfunctions in a plant that has been disconnected from an external network, a person in charge of repair, maintenance, or operation, has to go directly to the site.

It is an object of at least one embodiment of the present disclosure to provide an edge device, a connection establishment system, a connection establishment method, and a program that can automatically establish a connection with a remote monitoring device such that remote access from the remote monitoring device is made possible only when an abnormality has occurred in a plant.

According to an aspect of the present disclosure, an edge device includes a controller configured to detect an abnormality on the basis of data regarding an observation target device, and a connection establishment unit configured to establish a connection with a remote monitoring device such that the remote monitoring device is able to remotely access the edge device when the controller has detected the abnormality and determined that the detected abnormality matches a predetermined condition, wherein the remote access is a connection for remotely checking a state of the observation target device, or for enabling a remote manipulation of the observation target device.

According to at least one of the above aspects, only when an abnormality has occurred in the plant, remote access from the remote monitoring device is made possible such that appropriate countermeasures can be taken even if a person in charge of repair does not go to the site.

DESCRIPTION OF EMBODIMENTS

First Embodiment

Hereinafter, an edge device 4 according to a first embodiment will be described with reference to FIGS. 1 to 4.
(Overall Configuration)

Figure 1:
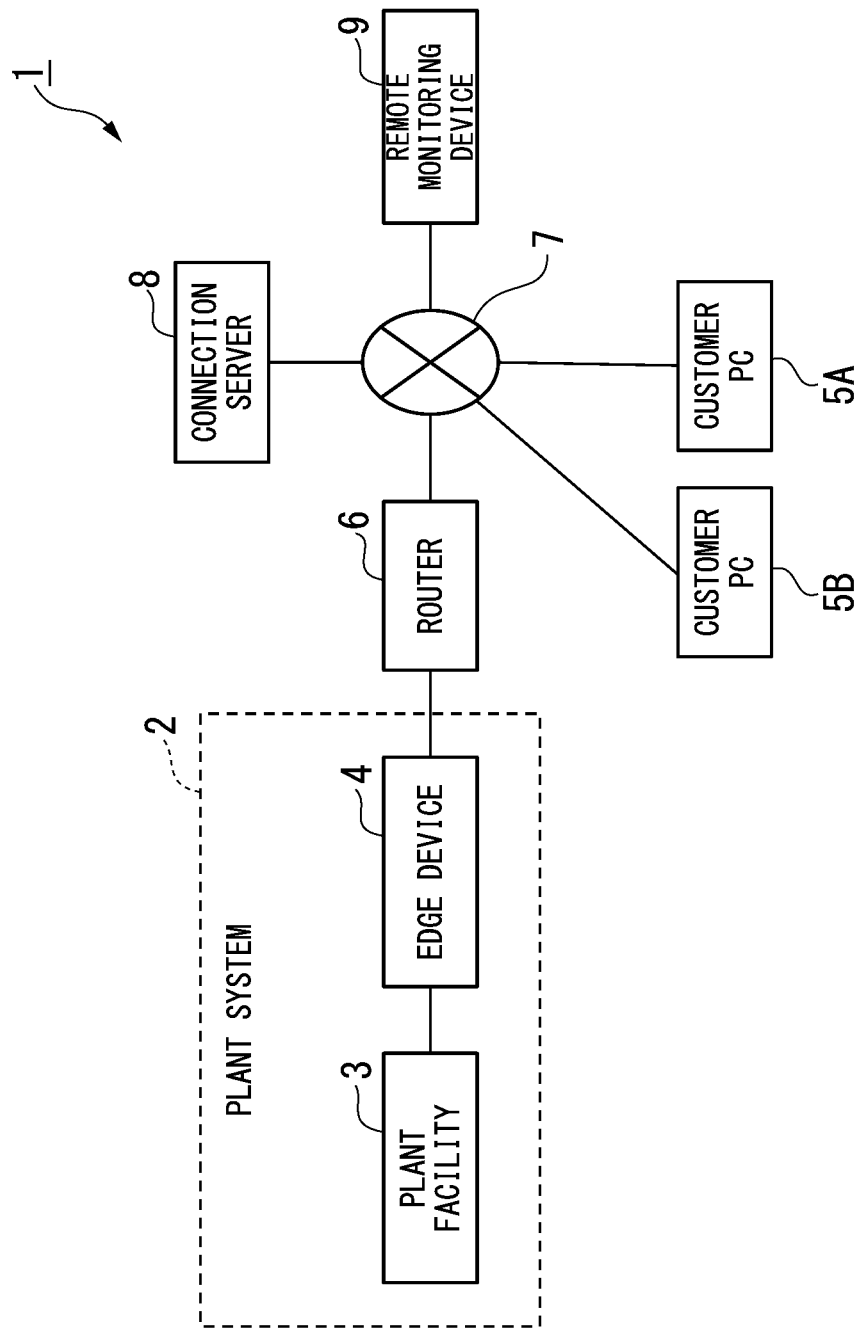
FIG. 1 is a diagram showing an overall configuration of a connection establishment system including an edge device according to a first embodiment.

FIG. 1 is a diagram showing an overall configuration of a connection establishment system 1 including the edge device 4 according to the first embodiment.

The connection establishment system 1 includes a plant system 2, a router 6, an external network 7, a connection server 8, and a remote monitoring device 9. The plant system 2 includes a plant facility 3 and the edge device 4. The plant facility 3 includes, for example, a machine with a rotating part such as a compressor, a pump, a paper machine, and paper converting machine.

The edge device 4 is connected to the plant facility 3 and the router 6. The connection between them may be wireless or wired. The router 6 may be a mobile router. The edge device 4 includes a function of analyzing data collected by the plant facility 3. Therefore, the edge device 4 is configured such that it is not accessible directly from customer PCs 5A and 5B. That is, the customer PCs 5A and 5B do not know an ID and password for connecting to the edge device 4 and only the remote monitoring device 9 knows the ID and password.

On the other hand, if the remote monitoring device 9 can freely connect to the edge device 4 by a remote desktop (RDP) or the like, the remote monitoring device 9 can freely acquire data of the plant facility 3. In order to prevent this, the customer PCs 5A and 5B have permission for connection by an RDP or the like. Thus, the remote monitoring device 9 can connect to the edge device 4 by an RDP or the like only when the customer PCs 5A and 5B permit connection.

Further, the customer PCs 5A and 5B can access a web application of a web server in the edge device 4 by http. Accordingly, the customer PCs 5A and 5B can read results of analysis by the edge device 4 by accessing the web application by http.

The customer PCs 5A and 5B are connected to the external network 7. Although only two customer PCs 5A and 5B are illustrated in FIG. 1, the number of customer PCs similar to the customer PCs 5A and 5B may be one or three or more. The customer PCs 5A and 5B may be portable terminals such as tablet terminals, smartphones, mobile phones, or laptop computers or may be any fixed terminals including desktop personal computers. Further, the customer PCs 5A and 5B may access the edge device 4 by the same method as the remote monitoring device 9 accesses the edge device 4 by an RDP or the like or may access it by another method.

The router 6 functions as a communication path that connects the plant system 2 and the external network 7. The router 6 is connected to the connection server 8 and the remote monitoring device 9 via the external network 7. The connection between them may be wireless or wired. The connection server 8 is a server for realizing secure communication between the plant system 2 and the remote monitoring device 9 and secure communication between the plant system 2 and the customer PCs 5A and 5B. The connection server 8 may realize secure communication, for example, using the technology of Weaved, Inc. (currently remot3.it) (US Patent Application Publication No. 2016/0344745). However, the connection server 8 may realize secure communication using other technologies without being limited to that of the above embodiment.

(Functional Configuration of Plant Facility)

Figure 2:
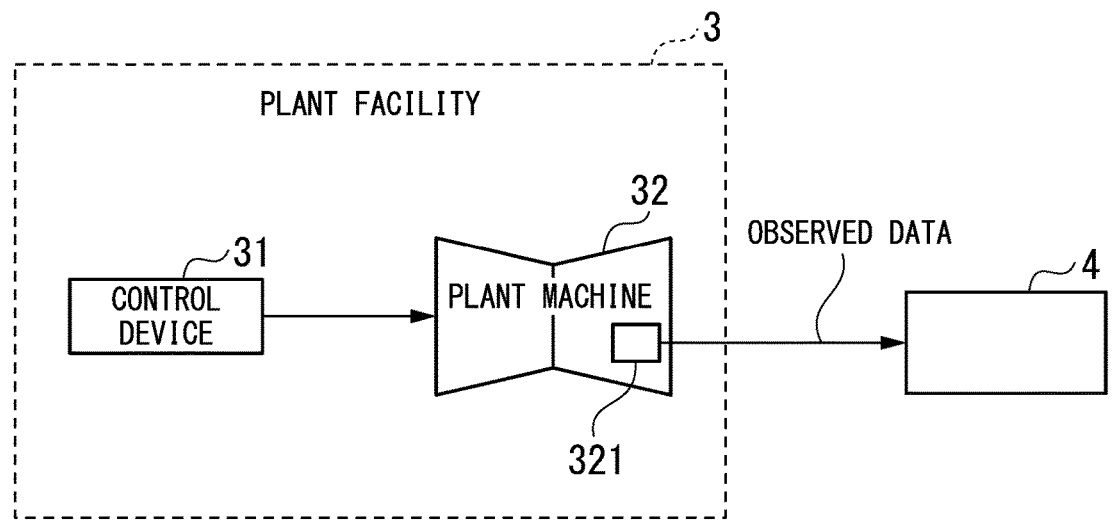
FIG. 2 is a diagram showing a functional configuration of a plant facility according to the first embodiment.

FIG. 2 is a diagram showing a functional configuration of the plant facility 3 according to the first embodiment.

The plant facility 3 includes a control device 31, a plant machine 32 with a rotating part, and a sensor 321. The plant machine 32 with a rotating part may be, but is not limited to, a compressor, a pump, or a paper machine. Further, the number of plant machines 32 may be two or more. The control device 31 controls the plant machine 32. The sensor 321 is attached to the plant machine 32. The sensor 321 observes vibration data of the plant machine 32 and transmits the observed data to a database 44 in the edge device 4. The number of sensors 321 attached to the plant machine 32 may be two or more. Data observed by the sensor 321 is described herein as vibration data. However, the observed data is not limited to vibration data and may be various data observed by various sensors or may be data acquired from a distributed control system (DCS).

(Functional Configuration of Edge Device)

Figure 3:
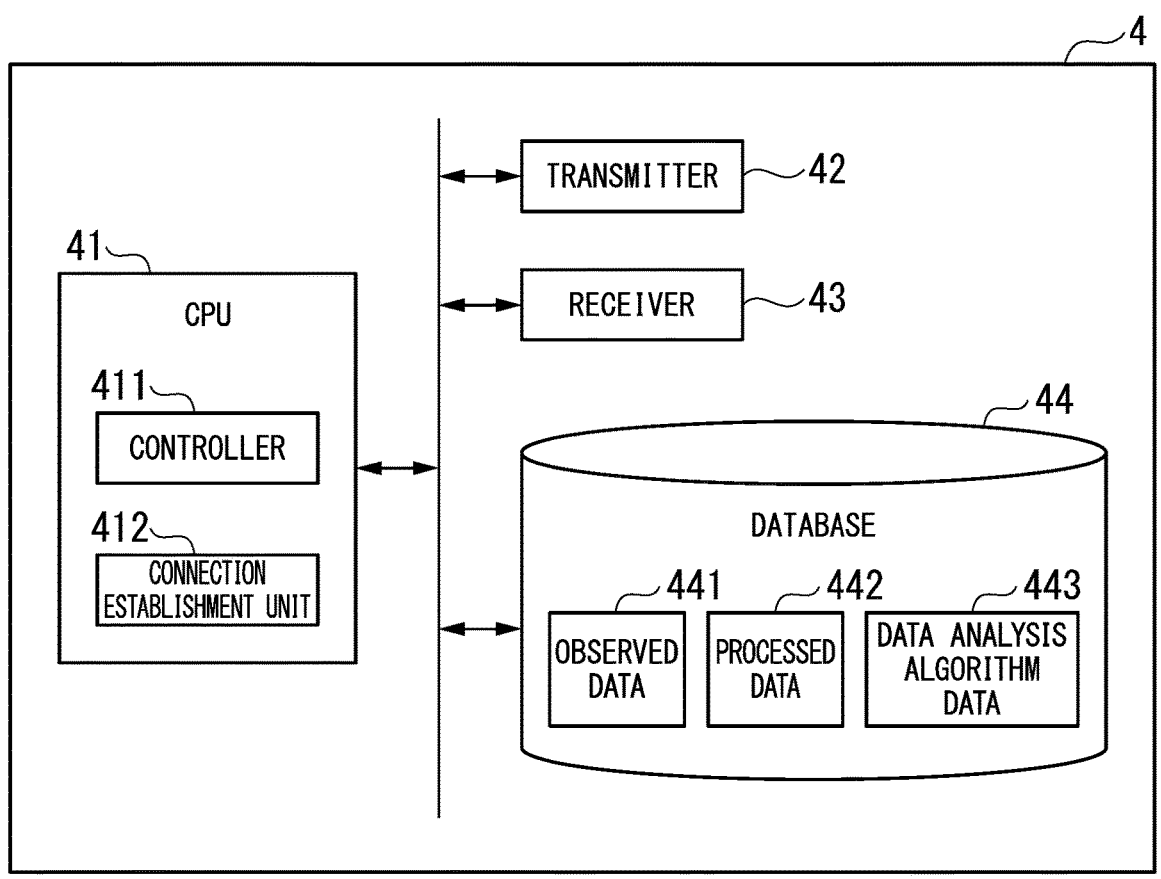
FIG. 3 is a diagram showing a functional configuration of the edge device according to the first embodiment.

FIG. 3 is a diagram showing a functional configuration of the edge device 4 according to the first embodiment.

As shown in FIG. 3, the edge device 4 includes a CPU 41, a transmitter 42, a receiver 43, and the database 44. The CPU 41 is a processor that performs various functions and controls the entire operation of the edge device 4 by operating according to a program prepared in advance. The CPU 41 functions as a controller 411 and a connection establishment unit 412.

The database 44 stores observed data 441, processed data 442, and data analysis algorithm data 443. Here, the database 44 may further store data regarding abnormal states that have occurred in the past or the like. The database 44 is a mass storage device (nonvolatile memory) provided in the edge device 4 and is, for example, a hard disk drive (HDD) or a solid state drive (SSD). The database 44 is also referred to as an auxiliary storage device, in which acquired information is recorded.

The observed data 441 is, for example, vibration data observed by the sensor 321 of the plant facility 3. Here, the observed data 441 may be stored in a state of being organized as per date or time. The processed data 442 is data created by the controller 411 performing a transformation process such as a fast Fourier transform (FFT) on the observed data 441. Here, the transformation process is not limited to the above and may be another process. The data analysis algorithm data 443 is data used for abnormality detection.

The controller 411 performs a transformation process on the observed data 441. The controller 411 stores the transformed data as processed data 442. The controller 411 executes processing for determining whether or not an abnormality has been detected using the processed data 442 on the basis of a prediction algorithm stored in the data analysis algorithm data 443. The controller 411 may also execute processing for determining whether or not an abnormality has been detected using the observed data 441 on the basis of the prediction algorithm stored in the data analysis algorithm data 443. Examples of the abnormality detection method include the following methods.

Specifically, when there is a sufficient amount of observed data 441, the controller 411 determines which abnormal state the current state is close to among abnormal states that have occurred in the past, for example, by the k-nearest neighbor method on the basis of the processed data 442. Next, the controller 411 compares a representative feature amount of the determined abnormal state with a corresponding feature amount of the current state and determines whether or not the current state is abnormal.

When there is not a sufficient amount of observed data 441, the controller 411 compresses feature amounts of normal data, for example, by principal component analysis and performs clustering for each feature amount. If the data of the current state is not close to any cluster of the normal data, the controller 411 determines that the current state is abnormal.

In another embodiment, the controller 411 collects vibration data as the observed data 441, performs a fast Fourier transform on the vibration data, and extracts frequency feature amounts of the vibration data. The controller 411 stores a data space of normal data in the database 44 by the k-nearest neighbor method on the basis of the frequency feature amounts. A threshold value is preset for the data space of normal data by the remote monitoring device 9.

Next, when the receiver 43 has received new data, the controller 411 measures the distance between the data space of normal data and the new data. The controller 411 determines that there is an abnormality when the measured distance exceeds a preset threshold value.

In the above abnormality determination method, setting of the "threshold value" has a great influence on abnormality determination. Further, since an appropriate "threshold value" varies depending on the characteristics of each facility or the usage environment of the customer, it is necessary to update the threshold value as appropriate while observing the operation status and data. This update operation is performed by accessing the edge device 4 from the remote monitoring device 9.

There is a possibility that the accuracy of abnormality detection can be improved by combining the k-nearest neighbor method with another abnormality detection method, for example, a support vector machine or a variational Bayes technique, rather than using the k-nearest neighbor method alone. When such a possibility is found from the collected data, the edge device 4 may be accessed from the remote monitoring device 9 and updated in such a manner that an additional algorithm is added to the current prediction algorithm.

Although two abnormality detection methods have been described above, the abnormality detection method is not limited to the above.

When it is determined that there is an abnormality, the connection establishment unit 412 establishes an SSH connection with a device having a preset destination address for secure data transmission. The transmitter 42 transmits information regarding the abnormality to the preset destination address by SFTP on the established communication path. However, the secure data transmission method is not limited to the above.

After the data transmission is completed, the controller 411 cuts off the connection for data transmission. Next, the controller 411 determines whether or not the detected abnormality is severe. Examples of the method of determining whether or not the detected abnormality is severe include the following methods.

Specifically, in the specific example of the abnormality detection method described above, when there is a sufficient amount of observed data 441, the controller 411 compares a representative feature amount of the determined abnormal state with a corresponding feature amount of the current state. At this time, the controller 411 determines whether or not the abnormality is severe on the basis of the magnitude of the difference between these feature amounts.

Further, in the specific example described above, when there is not a sufficient amount of observed data 441, the controller 411 performs clustering for each feature amount as described above. At this time, the controller 411 determines whether or not the abnormality is severe on the basis of the magnitude of the difference between the data of the current state and the normal data.

Alternatively, when a large amount of data in normal states has been stored in the database 44, the controller 411 constructs a hyperplane or the like that characterizes its data space in advance by machine learning (for example, by the k-nearest neighbor method or a support vector machine). When the controller 411 has obtained abnormal data, the controller 411 determines the degree of the abnormality on the basis of the distance from the "normal data space." For example, when the feature amount is normalized, the distance is represented by 0 to 100%. The controller 411 determines that the abnormality is severe when the distance is 80% or more and that the abnormality is not severe when the distance is less than 80%. However, the method of determining the degree of the abnormality is not limited to the above.

When it is determined that the abnormality is severe, the connection establishment unit 412 establishes a remotely accessible connection with the remote monitoring device. When a connection has been established between the edge device 4 and the remote monitoring device 9, the remote monitoring device 9 becomes able to remotely access the edge device 4. Here, the expression "remotely access (remote access)" represents to connect (connection) for remotely checking a state of the observation target device, or for enabling a remote manipulation of the observation target device. The remote monitoring device 9 may include a remote control device for remotely controlling the observation target device, a remote data acquisition device for remotely acquiring data from the observation target device, and the other devices regarding the remote access. When an abnormality repair process is completed, the connection establishment unit 412 cuts off the connection.

When it is determined that the abnormality is severe, the transmitter 42 notifies the remote monitoring device 9 that a severe abnormality has been detected through the established connection.

On the other hand, when it is determined that the abnormality is not severe, an on-site person in charge of the plant who has received information regarding the abnormality from the transmitter 42 accesses the edge device 4 and investigates the cause of the abnormality on the basis of the determined abnormal state or the analysis result. Further, the on-site person in charge of the plant performs repair work of the plant facility 3 as necessary.

The receiver 43 receives sensor values such as vibration data or operation data from a distributed control device (DCS) and transmits the received data to the database 44.

The functional configuration of the edge device 4 according to the first embodiment has been described above.

The edge device 4 may further include a display unit that displays the observed data 441 or the processed data 442.

In the above description, specific examples of the abnormality detection method have been described. However, an abnormality may be detected using another method stored in the data analysis algorithm data 443.

Further, when the remote monitoring device 9 remotely accesses the edge device 4, the remote monitoring device 9 may use a remote desktop (RDP) or another method to access it.

(Process Flow of Edge Device)

Figure 4:
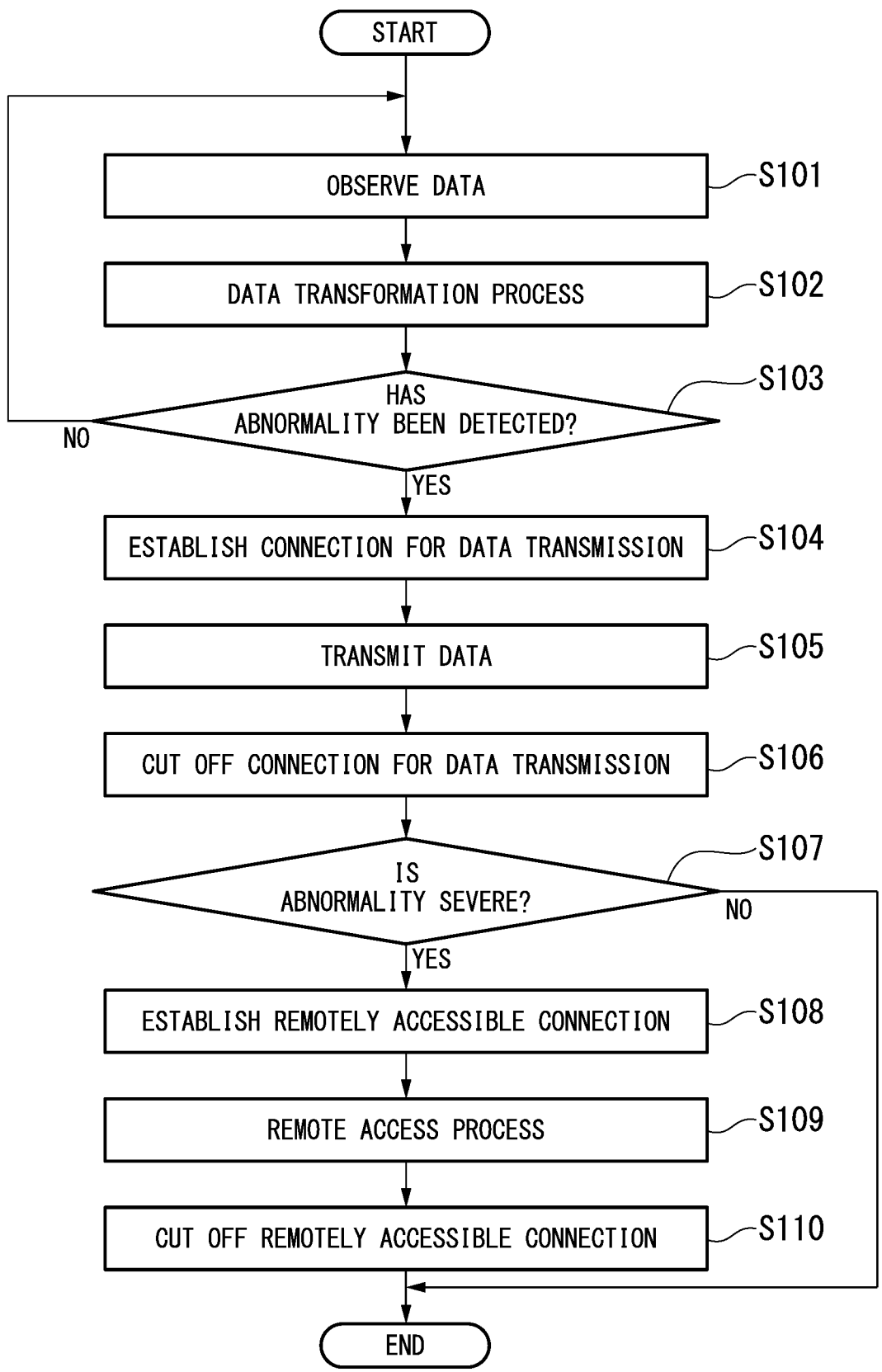
FIG. 4 is a diagram showing a process flow of the edge device according to the first embodiment.

FIG. 4 is a diagram showing a process flow of the edge device 4 according to the first embodiment.

First, the sensor 321 observes vibration data (step S101). The sensor 321 transmits the observed vibration data to the edge device 4. The receiver 43 of the edge device 4 receives sensor values such as vibration data or operation data from a distributed control device (DCS) and transmits the received data to the database 44. The database 44 stores vibration data as observed data 441. The controller 411 performs a transformation process on the observed data 441 (step S102). The controller 411 stores the transformed data as processed data 442. The controller 411 executes processing for determining whether or not an abnormality has been detected on the basis of the processed data 442 (step S103). The controller 411 may execute processing for determining whether or not an abnormality has been detected using the observed data 441 on the basis of a prediction algorithm stored in the data analysis algorithm data 443. Examples of the abnormality detection method include the following methods.

Specifically, when there is a sufficient amount of observed data 441, the controller 411 determines which abnormal state the current state is close to among abnormal states that have occurred in the past, for example, by the k-nearest neighbor method or the like on the basis of the processed data 442. Next, the controller 411 compares a representative feature amount of the determined abnormal state with a corresponding feature amount of the current state and determines whether or not the current state is abnormal.

When there is not a sufficient amount of observed data 441, the controller 411 compresses feature amounts of normal data, for example, by principal component analysis or the like and performs clustering for each feature amount. If the data of the current state is not close to any cluster of the normal data, the controller 411 determines that the current state is abnormal.

In another embodiment, the controller 411 collects vibration data as the observed data 441, performs a fast Fourier transform on the vibration data, and extracts frequency feature amounts of the vibration data. The controller 411 stores a data space of normal data in the database 44 by the k-nearest neighbor method on the basis of the frequency feature amounts. A threshold value is preset for the data space of normal data by the remote monitoring device 9.

Next, when the receiver 43 has received new data, the controller 411 measures the distance between the data space of normal data and the new data. The controller 411 determines that there is an abnormality when the measured distance exceeds a preset threshold value.

In the above abnormality determination method, setting of the "threshold value" has a great influence on abnormality determination. Further, since an appropriate "threshold value" varies depending on the characteristics of each facility or the usage environment of the customer, it is necessary to update the threshold value as appropriate while observing the operation status and data. This update operation is performed by accessing the edge device 4 from the remote monitoring device 9.

There is a possibility that the accuracy of abnormality detection can be improved by combining the k-nearest neighbor method with another abnormality detection method, for example, a support vector machine or a variational Bayes technique, rather than using the k-nearest neighbor method alone. When such a possibility is found from the collected data, the edge device 4 may be accessed from the remote monitoring device 9 and updated in such a manner that an additional algorithm is added to the current prediction algorithm.

Although two abnormality detection methods have been described above, the abnormality detection method is not limited to the above.

When it is determined that there is no abnormality (step S103: No), the sensor 321 returns to the observation of vibration data (step S101).

When it is determined that there is an abnormality (step S103: Yes), the connection establishment unit 412 establishes an SSH connection with a device having a preset destination address for secure data transmission (step S104). The transmitter 42 transmits information regarding the abnormality to the preset destination address by sFTP on the established communication path (step S105). However, the secure data transmission method is not limited to the above.

After the data transmission is completed, the controller 411 cuts off the connection for data transmission (step S106). Next, the controller 411 determines whether or not the detected abnormality is severe (step S107). Examples of the method of determining whether or not the detected abnormality is severe include the following methods.

Specifically, in the specific example of step S103 described above, when there is a sufficient amount of observed data 441, the controller 411 compares a representative feature amount of the determined abnormal state with a corresponding feature amount of the current state. At this time, the controller 411 determines whether or not the abnormality is severe on the basis of the magnitude of the difference between these feature amounts.

Further, in the specific example of step S103 described above, when there is not a sufficient amount of observed data 441, the controller 411 performs clustering for each feature amount as described above. At this time, the controller 411 determines whether or not the abnormality is severe using the magnitude of the difference between the data of the current state and the normal data.

Alternatively, when a large amount of data in normal states has been stored in the database 44, the controller 411 constructs a hyperplane or the like that characterizes its data space in advance by machine learning (for example, by the k-nearest neighbor method or a support vector machine). When the controller 411 has obtained abnormal data, the controller 411 determines the degree of the abnormality on the basis of the distance from the "normal data space." For example, when the feature amount is normalized, the distance is represented by 0 to 100%. The controller 411 determines that the abnormality is severe when the distance is 80% or more and that the abnormality is not severe when the distance is less than 80%. However, the method of determining the degree of the abnormality is not limited to the above.

When it is determined that the abnormality is severe (step S107: Yes), the connection establishment unit 412 establishes a remotely accessible connection with the remote monitoring device 9 (step S108). The transmitter 42 notifies the remote monitoring device 9 that a severe abnormality has been detected through the established connection. When a connection has been established between the edge device 4 and the remote monitoring device 9, the remote monitoring device 9 becomes able to remotely access the edge device 4.

The remote monitoring device 9 remotely accesses the edge device 4 and investigates the cause of the abnormality on the basis of the determined abnormal state or the analysis result (step S109). A person in charge of the remote monitoring device 9 contacts an on-site person in charge of the plant as necessary and instructs the on-site person in charge of the plant to perform repair work of the plant facility 3. After the repair process is completed, the connection establishment unit 412 cuts off the connection (step S110).

When it is determined that the abnormality is not severe (step S107: No), the on-site person in charge of the plant who has received information regarding the abnormality in step S105 accesses the edge device 4 and investigates the cause of the abnormality on the basis of the determined abnormal state or the analysis result. Further, the on-site person in charge of the plant performs repair work of the plant facility 3 as necessary.

Details of the process from when the sensor 321 observes the vibration data until the processing regarding the abnormality is completed have been described above.

The edge device 4 may also include a display unit that displays the observed data 441 or the processed data 442.

(Operation and Advantages)

The edge device 4 according to the first embodiment includes the controller 411 that detects an abnormality on the basis of the processed data 442 stored in the database 44 and the connection establishment unit 412 that establishes a connection with the remote monitoring device 9 such that the remote monitoring device 9 is able to remotely access the edge device 4 when the controller 411 has detected an abnormality.

Thus, in the first embodiment, only when an abnormality has occurred in the plant, the edge device 4 is made remotely accessible from the remote monitoring device such that appropriate countermeasures can be taken even if a person in charge of repair does not go to the site.

(Modifications of First Embodiment)

Although the edge device 4 according to the first embodiment has been described in detail above, specific modes of the edge device 4 are not limited to those described above and various design changes or the like can be made without departing from the scope of the invention.

(First Modification of First Embodiment)

For example, the edge device 4 according to the first embodiment has been described with reference to FIG. 4 such that, when it is determined that there is an abnormality (step S103: Yes), the transmitter 42 transmits information regarding the abnormality to the preset destination address by sFTP on the established secure communication path.

Here, as a first modification of the first embodiment, the controller 411 may distinguish the detected abnormality among mild to moderate abnormalities. For example, when a large amount of data in normal states has been stored in the database 44, the controller 411 constructs a hyperplane or the like that characterizes its data space in advance by machine learning (for example, by the k-nearest neighbor method or a support vector machine). When the controller 411 has obtained abnormal data, the controller 411 determines the degree of the abnormality on the basis of the distance from the "normal data space." For example, when the feature amount is normalized, the distance is represented by 0 to 100%. The controller 411 determines that the abnormality is severe when the distance is 80% or more, the abnormality is moderate when the distance is 50% to 80%, the abnormality is mild when the distance is 20% to 50%, and there is no abnormality when the distance is less than 20%. However, the method of determining the degree of the abnormality is not limited to the above.

Each degree of the abnormality is associated with a preset destination address. The transmitter 42 may transmit preset data content to a destination address corresponding to the degree of the abnormality determined by the controller 411. For example, when the detected abnormality is mild, the transmitter 42 may transmit information regarding the abnormality only to the address of a PC (5A) of an on-site person in charge of the plant. Further, when the detected abnormality is moderate, the transmitter 42 may transmit information regarding the abnormality to both the address of the PC (5A) of the on-site person in charge of the plant and the address of a PC (5B) of an on-site manager who is his or her supervisor.

When the destination address corresponding to the degree of the abnormality determined by the controller 411 is an address on the remote monitoring device 9 side, the connection establishment unit 412 may establish a connection with the remote monitoring device 9. At this time, the transmitter 42 notifies the destination address corresponding to the degree of the abnormality on the remote monitoring device 9 side that the abnormality has been detected through the established connection. A person in charge having a destination address corresponding to the degree of the abnormality on the remote monitoring device 9 side remotely accesses the edge device 4 and investigates the cause of the abnormality on the basis of the determined abnormal state or the analysis result. The person in charge on the remote monitoring device 9 side contacts the on-site person in charge of the plant as necessary and instructs the on-site person in charge of the plant to perform repair work of the plant facility 3. After the repair process is completed, the connection establishment unit 412 cuts off the connection.

Thus, depending on the type of the abnormality, information is transmitted only to those who need to know of the abnormality. Therefore, it is possible not only to reduce the annoyance to those who do not need to know of the abnormality but also to complete the repair process quickly.

It has been described above that, when an abnormality has been detected, data is transmitted to a destination address corresponding to the degree of the detected abnormality. Here, destination addresses to which data is to be transmitted are not limited to the addresses of the customer PCs 5A and 5B and the address of the remote monitoring device 9 side described above.

(Second Modification of First Embodiment)

For example, the edge device 4 according to the first embodiment has been described with reference to FIG. 4 such that, when it is determined that the detected abnormality is not severe (step S104: No), the transmitter 42 transmits information regarding the abnormality to the preset destination address.

Here, as a second modification of the first embodiment, the controller 411 may distinguish the detected abnormality among mild to moderate abnormalities. Each degree of the abnormality is associated with preset data content. The transmitter 42 may transmit data content corresponding to the degree of the abnormality determined by the controller 411 to a preset destination address. For example, when the detected abnormality is mild, the transmitter 42 may transmit data of a preset period in the processed data 442 to a specific address. Specifically, the transmitter 42 may transmit only data on the day when the abnormality occurred in the processed data 442 to the address of the PC (5A) of the on-site person in charge of the plant. Further, when the detected abnormality is moderate, the transmitter 42 may transmit data of 10 days from the date when the abnormality occurred in the processed data 442 to the address of the PC (5A) of the on-site person in charge of the plant.

Thus, a person who needs to know of the abnormality can know of only data necessary for repair according to the degree of the abnormality, and therefore the repair process can be completed quickly.

It has been described above that, when an abnormality has been detected, data content corresponding to the degree of the detected abnormality is transmitted to a preset destination address. Here, the data content to be transmitted is not limited to data content classified according to time as described above and may be data content classified according to the importance of data, the size of data, or the like.

The first and second modifications may also be combined such that data content corresponding to the degree of the abnormality is transmitted to a destination address corresponding to the degree of the abnormality.

(Third Modification of First Embodiment)

For example, the router 6 according to the first embodiment has been described with reference to FIG. 1 such that the router 6 functions as a communication path that connects the plant system 2 and the external network 7.

Here, as a third modification of the first embodiment, a power source of the router 6 may be normally off. Then, the connection establishment unit 412 may activate the router 6 and establish an only connection with the external network only when the controller 411 has detected a severe abnormality. After a repair process is completed, the connection establishment unit 412 may turn off the power of the router 6 and cut off the connection.

Thus, the connection between the edge device 4 and the external network 7 is cut off unless a severe abnormality occurs in the plant machine 32, and therefore the plant system 2 can be maintained in a more secure state.

Second Embodiment

Hereinafter, an edge device 4 according to a second embodiment will be described with reference to FIGS. 5 and 6.

(Overall Configuration)

Figure 5:
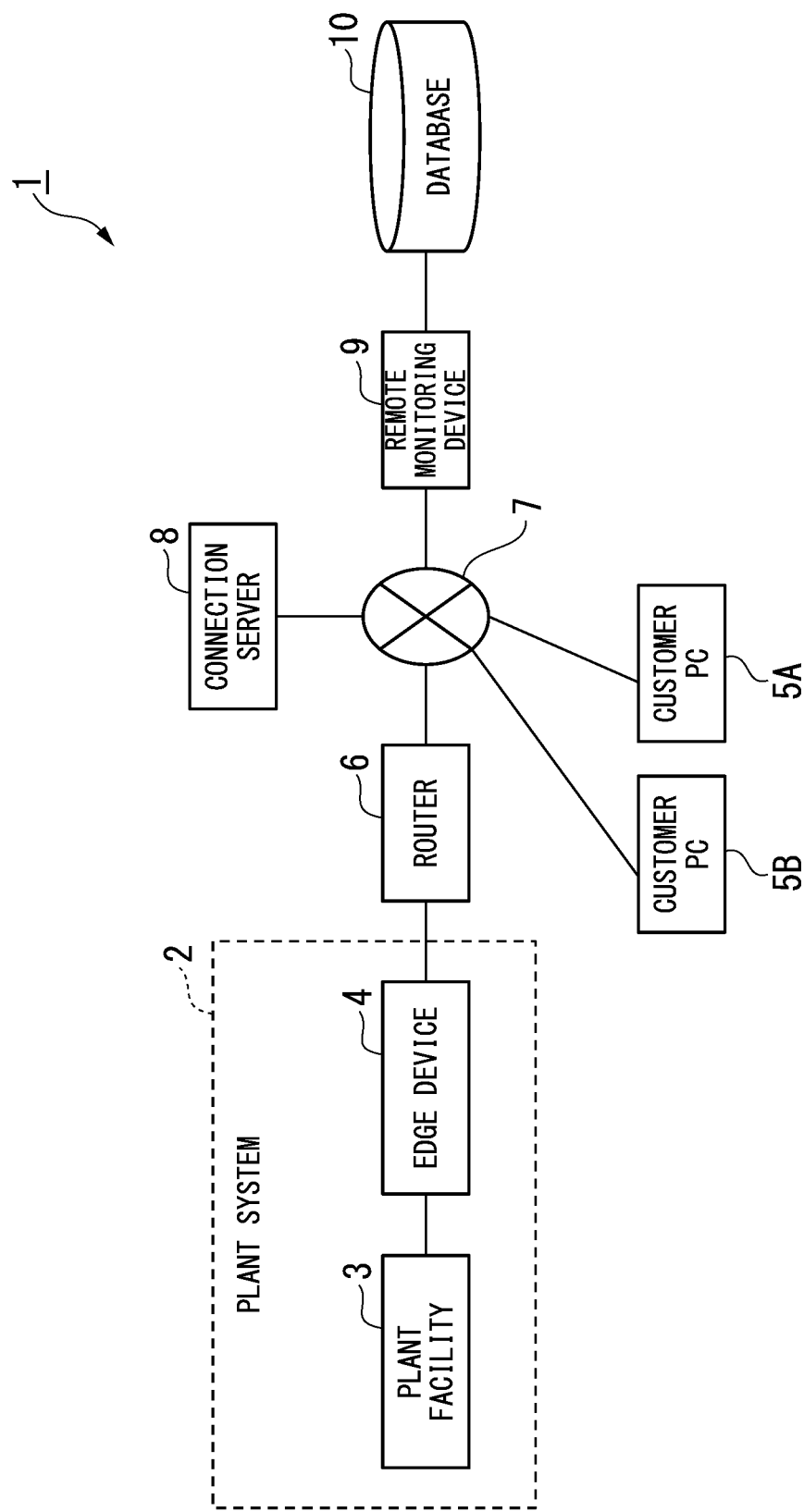
FIG. 5 is a diagram showing an overall configuration of a connection establishment system including an edge device according to a second embodiment.

FIG. 5 is a diagram showing an overall configuration of a connection establishment system 1 including the edge device according to the second embodiment.

As shown in FIG. 5, the connection establishment system 1 according to the second embodiment includes a data analysis algorithm database 10 in addition to the components of the first embodiment. Accordingly, the components other than the data analysis algorithm database 10 included in the connection establishment system 1 according to the second embodiment are configured and function in the same manner as those of the connection establishment system 1 according to the first embodiment unless otherwise stated.

The data analysis algorithm database 10 stores at least a prediction algorithm used when the controller 411 detects abnormalities.

(Functional Configuration of Edge Device)

The components included in the edge device 4 according to the second embodiment are configured and function in the same manner as those of the edge device 4 according to the first embodiment unless otherwise stated.

The controller 411 calculates a predicted value on the basis of the data analysis algorithm data 443. The controller 411 calculates a prediction error that is the difference between an observed value stored in the observed data 441 and the predicted value. The controller 411 determines whether or not the prediction error is greater than a preset allowable value.

When the prediction error is not greater than the preset allowable value, the controller 411 returns to the observation of vibration data.

When the prediction error is greater than the preset allowable value, the connection establishment unit 412 establishes a connection with the remote monitoring device. The transmitter 42 transmits information regarding the prediction error to the remote monitoring device 9 through the established connection.

The remote monitoring device 9 updates the prediction algorithm stored in the data analysis algorithm database 10 on the basis of the received information regarding the prediction error. The remote monitoring device 9 transmits the updated prediction algorithm to the receiver 43.

The database 44 updates the data analysis algorithm data 443 on the basis of the updated prediction algorithm. After the update process is completed, the connection establishment unit 412 cuts off the connection.

In the above method of updating the prediction algorithm, setting of the "allowable value" has a great influence on abnormality determination. Further, since an appropriate "allowable value" varies depending on the characteristics of each facility or the usage environment of the customer, it is necessary to update the threshold value as appropriate while observing the operation status and data. This update operation is performed by accessing the edge device 4 from the remote monitoring device 9.

There is a possibility that the accuracy of abnormality detection can be further improved by combining the k-nearest neighbor method with another abnormality detection method, for example, a support vector machine or a variational Bayes technique or the like, rather than using the k-nearest neighbor method alone. When such a possibility is found from the collected data, the edge device 4 may be accessed from the remote monitoring device 9 and updated in such a manner that an additional algorithm is added to the current prediction algorithm.

(Process Flow of Edge Device)

Figure 6:
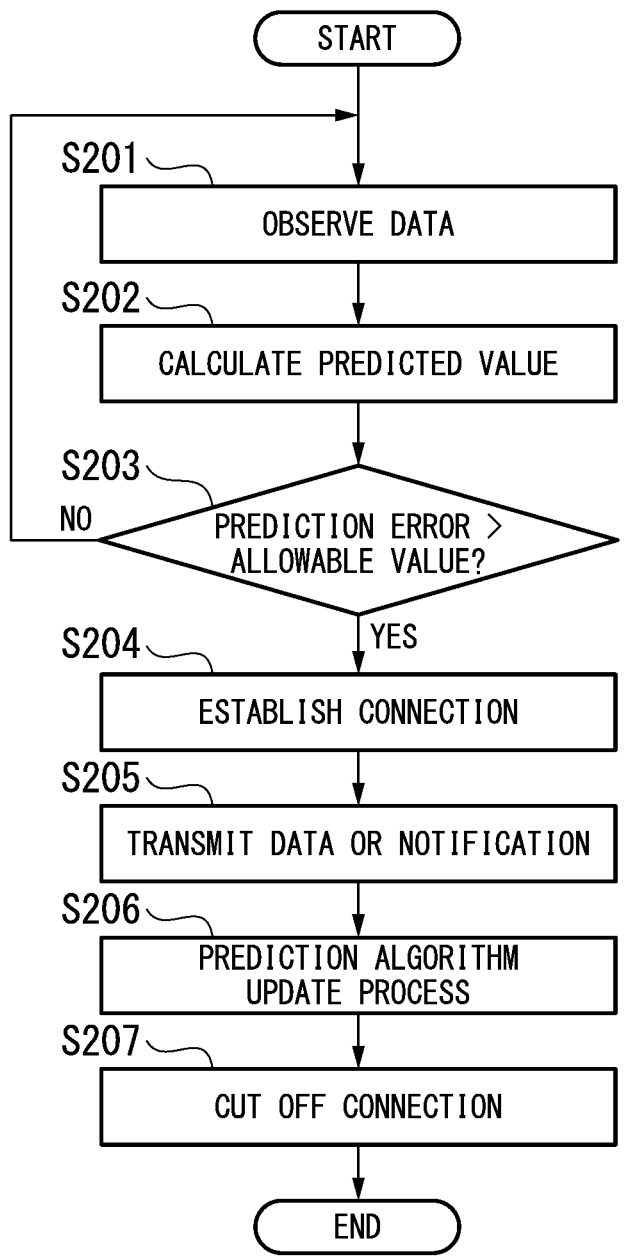
FIG. 6 is a diagram showing a process flow of the edge device according to the second embodiment.

FIG. 6 is a diagram showing a process flow of the edge device according to the second embodiment.

The process flow of the edge device 4 according to the second embodiment shown in FIG. 6 is a process flow for updating the prediction algorithm used for abnormality detection. This process flow is executed before step S101 of the edge device 4 according to the first embodiment. Alternatively, this process flow is executed in parallel when steps S101 to S110 are executed.

First, the sensor 321 observes vibration data (step S201). The sensor 321 transmits the observed vibration data to the edge device 4. The receiver 43 of the edge device 4 receives sensor values such as vibration data or operation data from a distributed control device (DCS) and transmits the received data to the database 44. The database 44 stores vibration data as observed data 441. The controller 411 calculates a predicted value on the basis of the data analysis algorithm data 443 (step S202). The controller 411 calculates a prediction error that is the difference between the observed value stored in the observed data 441 and the predicted value. The controller 411 determines whether or not the prediction error is greater than a preset allowable value (step S203).

When the prediction error is not greater than the preset allowable value (step S203: No), the controller 411 returns to the observation of vibration data (step S201).

When the prediction error is greater than the preset allowable value (step S203: Yes), the connection establishment unit 412 establishes a connection with the remote monitoring device (step S204). The transmitter 42 transmits information regarding the prediction error to the remote monitoring device 9 through the established connection (step S205). The remote monitoring device 9 updates the prediction algorithm stored in the data analysis algorithm database 10 on the basis of the received information regarding the prediction error. The remote monitoring device 9 transmits the updated prediction algorithm to the receiver 43. The database 44 updates the data analysis algorithm data 443 on the basis of the updated prediction algorithm (step S206). After the update process is completed, the connection establishment unit 412 cuts off the connection (step S207).

It has been described above that, when the prediction error is greater than the preset allowable value, the information regarding the prediction error is transmitted to the remote monitoring device 9. Here, the transmitter 42 may be configured to, when transmitting the information regarding the prediction error, transmit related information stored in edge devices in a plurality of plant facilities including the plant facility 3 to the remote monitoring device 9.

(Operation and Advantages)

The edge device 4 according to the second embodiment includes the controller 411 that detects an abnormality on the basis of data stored in the database 44 and the connection establishment unit 412 that establishes a connection with the remote monitoring device 9 such that the remote monitoring device 9 is able to remotely access the edge device 4 when the controller 411 has detected an abnormality, wherein the data stored in the database 44 stores an observed value and a prediction algorithm, the controller 411 determines whether or not an error between a predicted value based on the prediction algorithm and the observed value is greater than an allowable value, the connection establishment unit 412 establishes a connection with the remote monitoring device 9 when the error is greater than the allowable value, the edge device 4 further includes the transmitter 42 that transmits information regarding the error to the remote monitoring device 9 and the receiver 43 that receives, from the remote monitoring device 9, update information of the prediction algorithm that the remote monitoring device 9 has generated using the information regarding the error, and the controller 411 updates the prediction algorithm using the update information.

Thus, it is possible to easily and securely perform regular maintenance of the prediction algorithm used for abnormality detection. Further, a service provider on the remote monitoring device 9 side can provide a highly reliable prediction algorithm. Further, since know-how for updating the prediction algorithm does not need to be placed in equipment on the edge device 4 side, know-how leakage can be prevented.

(Modifications of Second Embodiment)

Although the edge device 4 according to the second embodiment has been described in detail above, specific modes of the edge device 4 are not limited to those described above and various design changes or the like can be made without departing from the scope of the invention.

(First Modification of Second Embodiment)

For example, the edge device 4 according to the second embodiment has been described with reference to FIG. 6 such that, after the connection is established (step S204), the transmitter 42 transmits the information regarding the prediction error to the remote monitoring device 9 through the established connection.

Here, as a first modification of the second embodiment, the transmitter 42 may notify the remote monitoring device 9 that the prediction error is greater than the allowable value, instead of transmitting the information regarding the prediction error to the remote monitoring device 9. Next, the remote monitoring device 9 remotely accesses the edge device 4, reads or searches for the information regarding the prediction error and the data analysis algorithm data 443, and updates the data analysis algorithm data 443 in the edge device 4. After the update process is completed, the connection establishment unit 412 cuts off the connection.

Thus, it is possible to easily and securely perform regular maintenance of the prediction algorithm used for abnormality detection. Further, a service provider on the remote monitoring device 9 side can provide a highly reliable prediction algorithm. Further, since know-how for updating the prediction algorithm does not need to be placed in equipment on the edge device 4 side, know-how leakage can be prevented.

It has been described above that, after remotely accessing the edge device 4, the remote monitoring device 9 reads or searches for the information regarding the prediction error and the data analysis algorithm data 443 and updates the data analysis algorithm data 443 in the edge device 4. Here, when updating the data analysis algorithm data 443 in the edge device 4, the remote monitoring device 9 may further perform data analysis in the edge device 4 and perform the update.

(Second Modification of Second Embodiment)

For example, the edge device 4 according to the second embodiment has been described with reference to FIG. 6 such that, when the prediction error is greater than the allowable value (step S203: Yes), the information regarding the prediction error is transmitted to the remote monitoring device 9.

Here, as a second modification of the second embodiment, the connection establishment unit 412 may establish a connection with the remote monitoring device 9 and transmit information regarding the prediction error to the remote monitoring device 9 at regular intervals, rather than only when the prediction error is greater than the allowable value. For example, the connection establishment unit 412 may establish a connection with the remote monitoring device 9 and transmit information regarding the prediction error to the remote monitoring device 9 at a time preset by a company that owns the plant system 2. Alternatively, the connection establishment unit 412 may establish a connection with the remote monitoring device 9 and transmit information regarding the prediction error to the remote monitoring device 9 in response to an operation of the user of the customer PC 5A.

Thus, the prediction algorithm stored in the data analysis algorithm data 443 can be maintained in a state with higher reliability.

Although some embodiments of the present disclosure have been described, these embodiments are all presented by way of example and are not intended to limit the scope of the invention. These embodiments can be implemented in various other forms, and various omissions, substitutions, and changes can be made without departing from the spirit of the invention. These embodiments and modifications thereof are included in the scope or spirit of the invention as well as in the scope of the invention described in the claims and their equivalents.

The procedures of the above processes of the CPU 41 are stored in a computer-readable recording medium in the form of a program and the above processes are performed by the CPU 41 reading and executing the program. Here, the "computer-readable recording medium" refers to a magnetic disk, a magneto-optical disk, a CD-ROM, a DVD-ROM, a semiconductor memory, or the like. The computer program may also be delivered to the computer via a communication line and the computer (CPU 41) which has received the program may execute the program.

The program may be one for realizing some of the above-described functions. The program may also be a so-called differential file (differential program) which can realize the above-described functions in combination with a program already recorded in the computer system. Further, the computer (CPU 41) may be composed of a single computer or may be composed of a plurality of computers that are communicatively connected.

According to a second aspect of the present disclosure, the edge device further includes a transmitter configured to transmit data regarding the observation target device or information regarding the abnormality.

According to a third aspect of the present disclosure, the controller is configured to determine a degree of the abnormality on the basis of the data regarding the observation target device, the connection establishment unit is configured to establish the connection when the degree of the abnormality determined by the controller is severe, and the transmitter is configured to transmit the information regarding the abnormality to a preset destination address when the degree of the abnormality determined by the controller is not severe.

According to a fourth aspect of the present disclosure, each degree of the abnormality is associated with a preset destination address, and the transmitter is configured to transmit preset data content to a destination address corresponding to the degree of the abnormality determined by the controller.

According to a fifth aspect of the present disclosure, each degree of the abnormality is associated with preset data content, and the transmitter is configured to transmit data content corresponding to the degree of the abnormality determined by the controller to a preset destination address.

According to a sixth aspect of the present disclosure, each degree of the abnormality is associated with a preset period, and the transmitter is configured to transmit data of a period corresponding to the degree of the abnormality determined by the controller to a preset destination address.

According to a seventh aspect of the present disclosure, the data regarding the observation target device stores an observed value and a prediction algorithm, the controller is configured to determine whether or not an error between a predicted value based on the prediction algorithm and the observed value is greater than an allowable value, the connection establishment unit is configured to establish a connection with the remote monitoring device when the error is greater than the allowable value, the transmitter is configured to transmit information regarding the error to the remote monitoring device, the edge device further includes a receiver configured to receive, from the remote monitoring device, update information of the prediction algorithm that the remote monitoring device has generated using the information regarding the error, and the controller is configured to update the prediction algorithm using the update information.

According to an eighth aspect of the present disclosure, the data regarding the observation target device stores an observed value and a prediction algorithm, the controller is configured to determine whether or not an error between a predicted value based on the prediction algorithm and the observed value is greater than an allowable value, the connection establishment unit is configured to establish a connection with the remote monitoring device when the error is greater than the allowable value, the transmitter is configured to transmit notification regarding the error to the remote monitoring device, such that the remote monitoring device is able to remotely access the edge device and to update the prediction algorithm using information regarding the error.

According to a ninth aspect of the present disclosure, the edge device is further connected to a router configured to establish a connection with an external network, power of the router is normally off, and the connection establishment unit is configured to activate the router and establish a connection with the external network when the controller has detected the abnormality.

According to a tenth aspect of the present disclosure, the edge device further includes a display unit configured to display data regarding the observation target device.

According to an eleventh aspect of the present disclosure, a connection establishment system includes a remote monitoring device, and the edge device according to the first aspect of the present disclosure.

According to a twelfth aspect of the present disclosure, a connection establishment method includes detecting an abnormality on the basis of data regarding an observation target device, and establishing a connection with a remote monitoring device such that the remote monitoring device is able to remotely access the edge device when the abnormality has been detected and the detected abnormality has been determined to match a predetermined condition, wherein the remote access is a connection for remotely checking a state of the observation target device, or for enabling a remote manipulation of the observation target device.

According to a thirteenth aspect of the present disclosure, a non-transitory computer-readable medium that stores a program causes a computer of an edge device to execute detecting an abnormality on the basis of data regarding an observation target device, and establishing a connection with a remote monitoring device such that the remote monitoring device is able to remotely access the edge device when the abnormality has been detected and the detected abnormality has been determined to match a predetermined condition, wherein the remote access is a connection for remotely checking a state of the observation target device, or for enabling a remote manipulation of the observation target device.

The components in the above embodiments can be appropriately replaced with known components without departing from the spirit of the present disclosure. The technical scope of the present disclosure is not limited to those of the above embodiments and various modifications can be made without departing from the spirit of the present disclosure.

REFERENCE SIGNS LIST

1 Connection establishment system
2 Plant system
3 Plant facility
31 Control device
32 Plant machine
321 Sensor
4 Edge device
41 CPU
411 Controller
412 Connection establishment unit
42 Transmitter
43 Receiver
44 Database
441 Observed data
442 Processed data
443 Data analysis algorithm data
5A, 5B Customer PC
6 Router
7 External network
8 Connection server
9 Remote monitoring device
10 Data analysis algorithm database

The invention claimed is:

1. A connection establishment method comprising:
   detecting an abnormality based on data regarding an observation target device;
   establishing a connection with a remote monitoring device such that the remote monitoring device is able to remotely access an edge device when the abnormality has been detected and the abnormality has been determined to match a predetermined condition,
   wherein:
   a connection establishment unit is configured not to admit the remote monitoring device to access the edge device without permission of a customer operating the observation target device while a controller has not detected the abnormality; and
   the connection with the remote monitoring device is for remotely checking a state of the observation target device, or for enabling a remote manipulation of the observation target device.

2. An edge device comprising:
   a controller configured to detect an abnormality based on data regarding an observation target device; and
   a connection establishment unit configured to establish a connection with a remote monitoring device such that the remote monitoring device is able to remotely access the edge device when the controller has detected the abnormality and determined that the abnormality matches a predetermined condition, wherein:
   the connection establishment unit is configured not to admit the remote monitoring device to access the edge device without permission of a customer operating the observation target device while the controller has not detected the abnormality; and
   the connection with the remote monitoring device is for remotely checking a state of the observation target device, or for enabling a remote manipulation of the observation target device.

3. The edge device according to claim 2,
   wherein the connection establishment unit is configured to admit the remote monitoring device to access the edge device according to the permission of the customer operating the observation target device even while the controller has not detected the abnormality.

4. The edge device according to claim 2, wherein:
   when there is a sufficient amount of observed data, the controller is configured to determine if a current state is close to one of a plurality of abnormal states that have occurred in the past, and then compare a representative feature amount of the one of the plurality of abnormal states with a corresponding feature amount of the current state and determine whether or not the current state is abnormal; and when there is not a sufficient amount of observed data, the controller is configured to compress feature amounts of normal data and perform clustering for each of the feature amounts of the normal data, and if data of the current state is not close to any cluster of the normal data, the controller is configured to determine that the current state is abnormal.

5. The edge device according to claim 2, wherein the controller is configured to construct a hyperplane that characterizes normal data space in advance by machine learning, when a large amount of data in normal states has been stored in a database of the edge device; and when the controller has obtained data, the controller is configured to determine if the data is abnormal based on a distance from the normal data space.

6. The edge device according to claim 2, further comprising a transmitter configured to transmit data regarding the observation target device or information regarding the abnormality.

7. The edge device according to claim 6, wherein:

the controller is configured to determine a degree of the abnormality based on the data regarding the observation target device;

the connection establishment unit is configured to establish the connection with the remote monitoring device when the degree of the abnormality is severe; and the transmitter is configured to transmit the information regarding the abnormality to a preset destination address when the degree of the abnormality is not severe.

8. The edge device according to claim 6, wherein:

each degree of the abnormality is associated with a preset destination address; and the transmitter is configured to transmit preset data content to the preset destination address corresponding to the degree of the abnormality.

9. The edge device according to claim 6, wherein:

each degree of the abnormality is associated with preset data content; and the transmitter is configured to transmit the preset data content corresponding to the degree of the abnormality to a preset destination address.

10. The edge device according to claim 6, wherein:

each degree of the abnormality is associated with a preset period; and the transmitter is configured to transmit data of the preset period corresponding to the degree of the abnormality to a preset destination address.

11. The edge device according to claim 6, wherein:

the data regarding the observation target device stores an observed value and a prediction algorithm;

the controller is configured to determine whether or not an error between a predicted value based on the prediction algorithm and the observed value is greater than an allowable value;

the connection establishment unit is configured to establish the connection with the remote monitoring device when the error is greater than the allowable value;

the transmitter is configured to transmit information regarding the error to the remote monitoring device;

the edge device further comprises a receiver configured to receive, from the remote monitoring device, update information of the prediction algorithm that the remote monitoring device has generated using the information regarding the error; and the controller is configured to update the prediction algorithm using the update information.

12. The edge device according to claim 6, wherein:

the data regarding the observation target device stores an observed value and a prediction algorithm;

the controller is configured to determine whether or not an error between a predicted value based on the prediction algorithm and the observed value is greater than an allowable value;

the connection establishment unit is configured to establish the connection with the remote monitoring device when the error is greater than the allowable value; and the transmitter is configured to transmit information regarding the error to the remote monitoring device, such that the remote monitoring device is able to remotely access the edge device and update the prediction algorithm using the information regarding the error.

13. The edge device according to claim 2, wherein:

the edge device is further connected to a router configured to establish a connection with an external network;

power of the router is normally off; and the connection establishment unit is configured to activate the router and establish the connection with the external network when the controller has detected the abnormality.

14. The edge device according to claim 2, further comprising a display unit configured to display data regarding the observation target device.

15. A connection establishment system comprising:

a remote monitoring device; and the edge device according to claim 2.

16. A non-transitory computer-readable medium that stores a program causing a computer of an edge device to execute:

detecting an abnormality based on data regarding an observation target device;

establishing a connection with a remote monitoring device such that the remote monitoring device is able to remotely access an edge device when the abnormality has been detected and the abnormality has been determined to match a predetermined condition;

wherein:

a connection establishment unit is configured not to admit the remote monitoring device to access the edge device without permission of a customer operating the observation target device while a controller has not detected the abnormality; and the connection with the remote monitoring device is for remotely checking a state of the observation target device, or for enabling a remote manipulation of the observation target device.

* * * * *